United States Patent
Ziegler

(10) Patent No.: US 9,112,820 B2
(45) Date of Patent: Aug. 18, 2015

(54) DELAY QUEUES BASED ON DELAY REMAINING

(75) Inventor: Michael L Ziegler, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 219 days.

(21) Appl. No.: 13/562,901

(22) Filed: Jul. 31, 2012

(65) Prior Publication Data

US 2014/0036695 A1    Feb. 6, 2014

(51) Int. Cl.
*H04J 1/16* (2006.01)
*H04L 12/879* (2013.01)

(52) U.S. Cl.
CPC ................................ *H04L 49/901* (2013.01)

(58) Field of Classification Search
CPC .............. H04L 49/9015; H04L 49/901; H04L 43/0852; H04L 47/283; H04L 47/32; H04L 47/821; H04L 49/9047; H04L 49/90; H04L 51/34; H04L 51/38; H04L 2012/5651; H04L 2012/5652; H04L 2012/5679; H04L 2012/5681
See application file for complete search history.

(56) References Cited

U.S. PATENT DOCUMENTS

| | | | |
|---|---|---|---|
| 6,751,194 B1 * | 6/2004 | Ueno | 370/235 |
| 7,724,780 B2 | 5/2010 | Baird et al. | |
| 8,015,327 B1 * | 9/2011 | Zahavi et al. | 710/52 |
| 2006/0277534 A1 * | 12/2006 | Kasuya | 717/143 |
| 2009/0019505 A1 | 1/2009 | Gopalakrishnan et al. | |
| 2010/0296406 A1 | 11/2010 | Rahbar | |
| 2011/0088030 A1 * | 4/2011 | Agesen et al. | 718/1 |

FOREIGN PATENT DOCUMENTS

WO    WO-02071760 A2    9/2002
WO    WO-2011025502 A1    3/2011

* cited by examiner

*Primary Examiner* — Chi H Pham
*Assistant Examiner* — Raul Rivas
(74) *Attorney, Agent, or Firm* — Hewlett-Packard Patent Department

(57) ABSTRACT

Techniques are provided for performing a delay. A request for a delay may be received. A plurality of delay queues may be provided, with each delay queue spanning a range of delay remaining. The request may be assigned to a delay queue based on the delay remaining. The request may be moved to a different delay queue as the delay remaining decreases.

10 Claims, 8 Drawing Sheets

DELAY DESCRIPTOR

DELAY QUEUES BASED ON DELAY REMAINING

BACKGROUND

In electronic devices it is often necessary to provide a mechanism to implement a delay in time. For example, in an Application Specific Integrated Circuit (ASIC) within a network switch, it is often necessary for a process module on the ASIC to implement a delay in its processing operations. The process module may need to implement the delay for any number of reasons, such as to allow time for a different module to execute, to prevent over consumption of resources, or for any number of other reasons. The usefulness of adding delays in processing circuits is well known.

One mechanism for implementing a delay provides a free running counter. The counter is incremented after a defined period of time. When it is desired to institute a delay, a process may take the time period of the desired delay and divide it by the defined period of time to determine the number of counter increments, also referred to as ticks, that will occur in the defined time period. A timestamp may be created by adding the current value of the counter to the determined number of ticks. Upon every tick, the value of the counter may be compared to the value of the timestamp. Once they are equal, the desired delay has completed.

In some cases, it may be necessary to have more than one delay at a time. For example, there may be several process modules, each requiring a delay of a different period of time. An implementation for maintaining multiple delays may build on the mechanism described above. Just as above, for each desired delay, a timestamp may be computed. The timestamps may then be placed in an ordered list, from smallest to largest timestamp. Upon each increment of the counter, the timestamp at the head of the list may be compared to the counter, and if they are equal, the delay has completed. Because the timestamps are ordered, the next delay to complete will always be at the head of the list.

DETAILED DESCRIPTION

Figure 1:
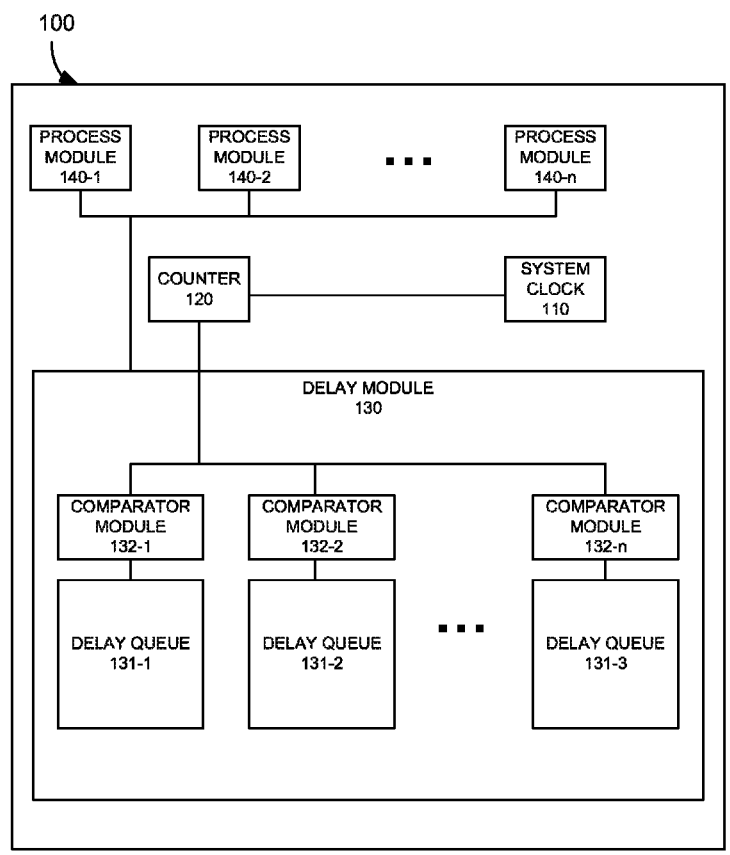
FIG. 1 depicts an example of a device that may use delays.

The delay mechanisms described above are perfectly workable, so long as the number of simultaneous delays needed are relatively small. However, problems arise as the number of simultaneous delays increases. For example, using the first mechanism, a comparator circuit is needed to compare the current value of the counter to the timestamp for each delay that can be concurrently in progress. In some systems, it may not be unreasonable to have on the order of 10,000 or more delays concurrently in progress. This would require at least 10,000 comparator circuits, all of which would be substantially identical. The amount of real estate on a chip consumed by the comparator circuits and associated signal lines increases as the number of possible concurrent delays increases.

The second mechanism solves some of the problems described above in that by placing the timestamps in an ordered list, only one comparator circuit is required to evaluate the timestamp at the head of the list. However, this simplification of the comparator circuitry comes with the price of added complexity in maintaining the list of timestamps. There is no guarantee that a requested delay will be placed at the end of the list. For example, a delay may be requested that is longer than the shortest delay in the list, but shorter than the longest delay in the list. As such, circuitry would be needed to traverse the list to determine the proper position within the list to add the new request. Once the proper position was found, space must be created within the list to accommodate the new delay. As is well known in the art, ordered list operations as described above are complex to implement in hardware logic. Furthermore, the fact that the list must be traversed and possibly rearranged in order to determine the proper position means that the operation may require many clock cycles to complete, resulting in possible performance problems.

The techniques described herein overcome the problems described above by providing a plurality of delay queues. Each delay queue may be associated with a non-overlapping range of delay remaining times. For example, one queue may contain delays that have between 4 and 7 ticks remaining, while the next queue may contain delays that have between 8 and 15 ticks remaining. The delay queues may be implemented as first in first out queues. In one example implementation, the queues may be implemented as a linked list. When a new delay is requested, the number of ticks remaining until the delay expires may be computed. The requested delay may then be associated with the appropriate delay queue by adding the request to the end of the queue. As will be explained in further detail below, it is not necessary to evaluate any other requests that may exist in the delay queue. The new request may simply be added to the end of the appropriate queue.

Upon every increment of the counter, the delay request at the head of each delay queue may be compared to the counter. If the delay remaining is such that the delay no longer belongs in the queue in which it currently resides, the delay may be moved to a different delay queue. For example, if the delay at the head of the 8 to 15 ticks remaining queue only has 6 ticks remaining, the delay may be moved to the delay queue associated with 4 to 7 ticks remaining. Again, the re-association is accomplished by simply appending the delay request to the end of the newly selected delay queue, without regard to any other delay requests in that queue. Once the delay request has reached a threshold value, which in some cases may be an exact value, where the delay can be considered complete, the requester of the delay may be notified that the delay has completed.

The techniques described herein overcome the problems described above. First, the number of comparator circuits required is limited to the number of delay queues that are implemented. Thus, there is no longer a need for an individual comparator for each delay that may be concurrently in progress. In addition, there is no longer a need for the complexity and performance problems introduced by requiring ordering of the delay requests. These techniques are described in further detail below and in conjunction with the appended figures.

FIG. 1 depicts an example of a device that may use delays. The device 100 may be any type of hardware device in which it may be useful to implement a delay mechanism. For example, the device may be an integrated circuit, an ASIC, a system on a chip (SOC), or any other device in which efficiently implementing multiple concurrent delays would be useful. The device may include a system clock 110, a counter 120, a delay module 130, and a plurality of process modules 140-1 ... n.

The system clock may provide a periodic reference signal to all of the synchronous components of the device. For example, the system clock may operate at a frequency of 1 gigahertz (1 Ghz). A 1 Ghz system clock generates a clock pulse every 1 nanosecond (ns). The use of a system clock in a synchronous circuit is well known in the art. Coupled to the system clock may be a counter 120. The counter, as the name implies, may begin at an initial value, such as zero, and be incremented after a specific period of time, which may be defined by a number of ticks of the system clock. For example, the counter may be incremented upon every 10 pulses of the system clock. Given the example presented above, this means the counter may be incremented every 10 ns. Thus, a 10 ns delay, as represented by one counter tick, would complete after 10 clock pulses. It should be understood that the specific numbers presented above are simply examples of one possible implementation. In some implementations the system clock may not run faster than the counter. What should be understood is that the system is able to execute many operations in the period of time between counter increments. This may be achieved through the system clock running faster than the counter increments or through other mechanisms that would be known to a person of skill in the art.

The delay module 130 may include a plurality of delay queues 131-1 ... n, each of which is associated with a comparator module 132-1 ... n. The delay queues may be first in first out queues. For example, the delay queues may be implemented as a linked list. The element at the beginning, or head of the list, would be the first element out of the queue, while the element at the end, or tail of the list would be the last element out of the queue. A new element would always be added at the tail end of the list.

Each of the delay queues may be associated with a number of counter ticks remaining. As explained above, when a delay is desired, the length of the delay may be converted to a number of counter ticks. The number of counter ticks may then be added to the current value of the counter resulting in a timestamp. Once the counter reaches the timestamp value, the delay is complete. As the counter increments, the number of ticks remaining until the delay is complete decreases. Each delay queue may be associated with a non-overlapping range of counter ticks remaining. The delay queues and their use will be described in further detail below.

Associated with each delay queue may be a comparator module 132-1 ... n. The comparator module may compare the value of the timestamp of the element at the head of its associated delay queue to the counter. The number of counter ticks remaining may be computed. Depending on the number of counter ticks remaining, the element may be moved from one delay queue to another, or may be removed completely in the case where the delay is to be considered complete. A more detailed description of this operation is provided below.

Process modules 140-1 ... n may be any type of process module that may need to implement a delay. The techniques described herein are not limited to any particular functionality provided by the process modules. However, to aid in the understanding of this disclosure, an example of one type of process module that may utilize delays is presented. However, it should be understood that this is only an example and the techniques presented herein are not limited to the described example.

In the example, the device 100 may be an ASIC that is included in a network switch. Each process module may be associated with a port on the switch. Assume each port, and thus process module, receives a stream of 1 kilobyte (kb) packets (i.e. 1024 bits). For purposes of this description assume that the streams from each port are to be combined into a single 10 Megabit per second (Mbps) output link. Also, assume that the rate of packets arriving at each port is much greater than 10 Mbps. As should be clear, absent some type of throttling mechanism, each process module would attempt to use the entire 10 Mbps of available bandwidth on the output link. Such a situation is clearly not sustainable. In order to more fairly share the available output link bandwidth, a delay may be used to limit the amount of bandwidth that can be consumed by any single process module.

For example, if there were 10 process modules, a fair allocation of bandwidth may be to provide each process module with 1 Megabits per second (Mbps) of the total available bandwidth (i.e. $\frac{1}{10}$ of the total bandwidth). If each process module were to send one data packet (1024 bits), which would take approximately 97.7 μs at 10 Mbps, and then delay for approximately 878.9 μs would effectively result in 1024 bits being sent every 976.6 μs. Expanding this to a full second results in approximately the desired rate of 1 Mbps per process module. What should be noted is that by varying the amount of delay, the bandwidth can be varied. For example, if the delay were reduced to approximately 390.8 μs, the effective per second bandwidth would be approximately 2 Mbps. As mentioned above, this is only an example of a use of a delay. Other uses would be readily apparent to a person of skill in the art.

In operation, a process module may need to implement a delay. The process module may determine the length of the delay required. This length may then be converted into a number of counter increments. The number of counter increments may be added to the current value of the counter to form a timestamp. The number of counter ticks remaining, which is the difference between the timestamp and the current counter value, can be computed. The delay request may then be placed into one of the delay queues based on the counter ticks remaining.

Upon each increment of the counter, the timestamp of the delay request at the head of each delay queue may be compared to the counter. One of three results may occur from each comparison. The first is that the number of ticks remaining is below a threshold value which determines when a delay is complete. In this case, the process requesting the delay is notified that the delay is complete. The second possibility is that the number of ticks remaining is such that the delay request is no longer in the appropriate delay queue. For example, if a delay request has 6 ticks remaining and is currently in the 8 to 15 ticks remaining queue, the delay request is not in the appropriate queue. The delay request may be moved to the appropriate queue. The final possibility is that the number of ticks remaining for the delay request is appropriate for the current delay queue and has not yet fallen below the threshold. In such a case, the delay request simply remains at the head of the delay queue until the next increment of the counter. If either of the first two results occurs and there is a next delay request in the queue, that element is examined immediately (not at the next counter increment). The same three results are again possible. This process repeats until either the third result is reached or the delay queue is empty. The operation of the delay queues is described in further detail below.

Figure 2A:
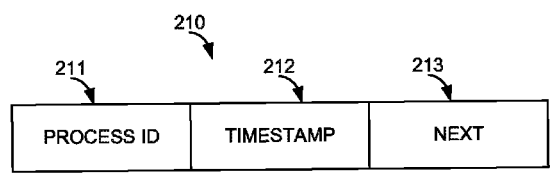
FIGS. 2($a,b$) depict examples of data structures that may be used to implement delays.

FIGS. 2(a,b) depict examples of data structures that may be used to implement delays. As mentioned above, there may be many process modules individually requesting concurrent delays. The techniques described herein provide a mechanism for associating a delay request to the process module that requested the delay, such that the process module, which will also be referred to as a process, can be notified once the delay is complete. FIG. 2(a) depicts an example of a delay descriptor 210. The delay descriptor may be a memory element that is used to represent a delay in progress. There may be a pool of delay descriptors and when a process wishes to implement a delay, a delay descriptor that is not currently in use may be obtained.

The delay descriptor may include a process ID 211. As the name implies, the process ID is used to identify the particular process that wishes to implement the delay. Once the delay is complete, the process with the corresponding process ID may be notified. The delay descriptor may also include a timestamp 212. As described above, the timestamp may be used to determine when the delay is complete. Once the timestamp and counter are sufficiently close to each other, as determined by a threshold, the delay is considered complete. The delay descriptor may also include a next 213 field. In one example implementation, the delay queues are implemented as linked lists. The next field may be used to point to the next delay descriptor in the list. A next field which is empty or contains a null value may indicate the delay descriptor is at the end of the list.

Figure 2B:
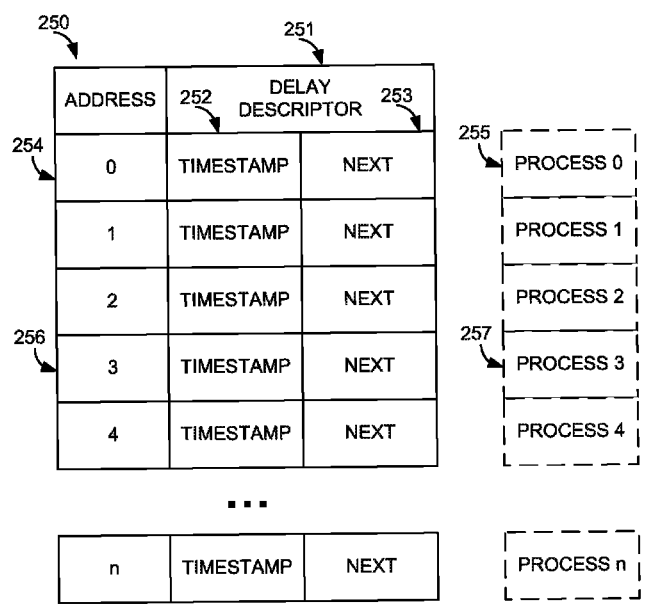

FIG. 2(b) depicts another example implementation for associating a delay request with the process that requested the delay. As shown, an area of memory addresses 250 may be defined. Delay descriptors 251 may be created in the area of memory. Just as above, the delay descriptors include the timestamp 252 and next 253 fields. However, what is absent is the process ID field. Rather, the address of the memory holding the delay descriptor may itself be used to identify the process. For example, the delay descriptor stored at memory address(0) 254 may be associated with a process identified as process(0) 255. Likewise, the delay descriptor at address(3) 256 may be associated with a process identified as process(3) 257. The specific associations and numbering are unimportant, but what should be understood is that the memory location itself is associated with a specific process. Thus, when a particular delay descriptor is considered complete, the process to be notified is inherently known.

Figure 3:
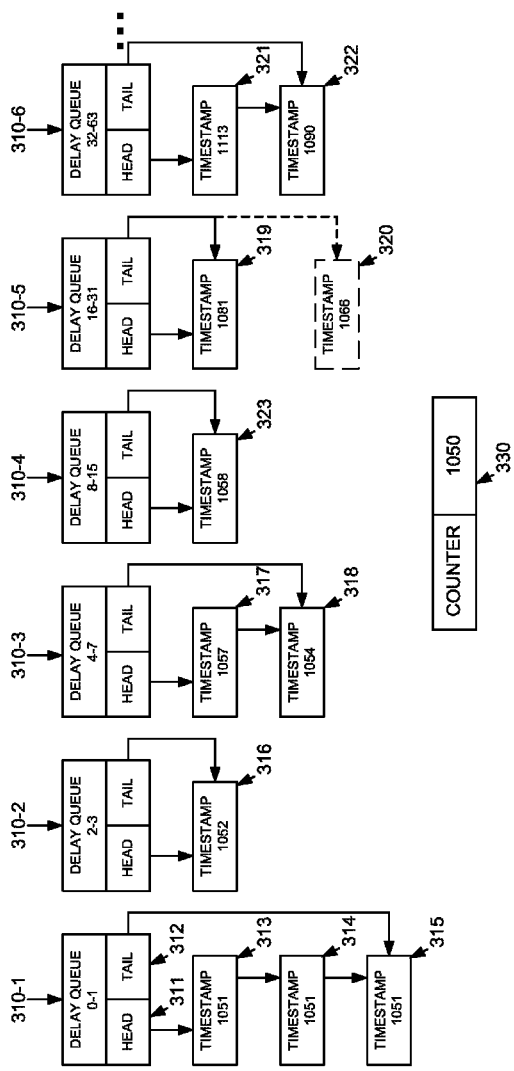
FIG. 3 depicts an example of delay queues.

FIG. 3 depicts an example of delay queues. As mentioned above, the delay queues each define a first in first out queue. Each queue has a non-overlapping range of ticks remaining. The delay queues may be visually represented as proceeding from left to right, with greater delays remaining being further to the right. Furthermore, the delay queues may have the property that each delay queue encompasses a range that is twice as big as the immediate preceding queue. In other words, the delay queues implement a 2:1 ratio. For example, if one delay queue encompasses the range of 10 to 19 ticks (10 ticks) remaining, the next delay queue will encompass a range that is twice as large. In this example, the next delay queue would encompass the range 20 to 39 ticks (20 ticks) remaining. The next delay queue would again be twice as large and encompass the range 40 to 79 ticks (40 ticks) remaining. As most electronic systems are binary and based on a power of two, the following description is based on power of two ranges. However, it should be understood that the techniques described herein are based on the 2:1 ratio of ranges, and not the particular power of two implementation described below. Furthermore, other ratios of ranges, such as 1.8:1 and 3:2 may also exhibit similar properties to the 2:1 ratio, and would also be usable with the techniques presented herein. In general, any ratio of ranges that exhibits the properties described below with respect to the 2:1 ratio could be used.

As shown in FIG. 3, there may be a plurality of delay queues 310-1 . . . n. Each delay queue may be associated with a range of remaining delays. For example, delay queue 310-2 may be associated with delays that have 2 to 3 ticks remaining, delay queue 310-3 may be associated with delays that have 4 to 7 ticks remaining, delay queue 310-4 may be associated with delays that have 8 to 15 ticks remaining, delay queue 310-5 may be associated with delays that have 16 to 31 ticks remaining, delay queue 310-6 may be associated with delays that have 32 to 63 ticks remaining. This progression may proceed until a delay queue that includes the maximum expected delay to be implemented exists.

It should be noted that delay queue 310-1, which is the delay queue associated with delays remaining of 0 to 1 ticks is slightly different than the other queues. A delay with 0 ticks remaining will never actually be placed into the delay queue 310-1. The reason for this is that if there are 0 ticks remaining, the delay is complete. There is no need to put it into a queue. As such, the delay queue 310-1 only includes delays that have 1 tick remaining. Thus, upon every counter increment, every delay request in delay queue 310-1 is complete and the associated process may be notified.

Each of the delay queues may have associated a queue descriptor that is made up of a head pointer 311, which points to the first delay descriptor in the queue. The delay descriptor at the head of the queue is the delay descriptor that will be processed first on each increment of the counter. As mentioned above, multiple descriptors in a delay queue may be processed on each counter increment. The process continues until no delay requests remain in the current delay queue or the delay request currently being processed is appropriate for the current delay queue. The queue descriptor may also include a tail pointer 312 which points to the end of the queue. When a new delay descriptor is to be added to a queue, the descriptor currently pointed to by the tail pointer is modified to have its next field point to the newly added delay descriptor. The tail pointer is then modified to point to the newly added delay descriptor.

Also shown in FIG. 3 is a counter 330. The value of the counter is compared to the timestamps to determine when a delay has completed. For purposes of ease of depiction, the delay descriptors shown in FIG. 3 only include the timestamp. However it should be understood that the delay descriptors may actually follow the structure described above with reference to FIG. 2(a-b).

Looking at delay queue 310-1, it is shown that there are three delay descriptors, 313, 314, 315, each of which have a time stamp of 1051, indicating that each of those delay descriptors has 1 tick remaining based on the shown counter value of 1050. When the counter increments to 1051, the head of delay queue 310-1 will be examined. It may be determined by the comparator (not shown) that the delay is now complete and the proper process is notified. Delay descriptor 313 may then be de-queued. Thus, the next delay descriptor 314, which is now at the head of the delay queue, may be compared to the counter and it may be determined that the delay has completed and that it may be de-queued and its associated process notified. The same process may occur with delay descriptor 314. It should be understood that this may all occur prior to the counter incrementing again, thus the delays expire at precisely the time period expected by the requesting process, within the level of precision defined by the counter.

Looking at delay queue 310-2, which contains delays from 2 to 3 ticks remaining, we see that the delay descriptor 316 has 2 ticks remaining. When the counter increments to 1051, the descriptor will only have 1 tick remaining. Thus, the delay descriptor 316 may be moved to delay queue 310-1.

Moving to delay queue 310-3, whose range is 4 to 7 ticks remaining, we see that there are two delay descriptors, 317, 318, with ticks remaining of 7 and 4 respectively. This may seem counterintuitive at first, as it may be confusing as to how delay descriptor 317, which expires later than delay descriptor 318, can be ahead of delay descriptor 318. Getting into this situation will be described in further detail below, but the situation resolves itself due to the ranges that are implemented in each counter. As shown, delay descriptor 317 has 7 ticks remaining. When the counter reaches 1054, delay descriptor 317 will only have 3 ticks remaining. At that point, it will be moved to delay queue 310-2. Delay descriptor 318, which would have 0 ticks remaining when the counter reaches 1054, is then at the head of the queue. As such, the delay is complete. Delay descriptor 318 can be de-queued and discarded and its associated process notified that the delay has completed.

As shown, delay queue 310-4 has a single delay descriptor 323 with a timestamp of 1058 in its list. Delay descriptor 323 may have 8 ticks remaining. After the counter increments to 1051, delay descriptor 323 may have 7 ticks remaining and is no longer appropriate for delay queue 310-4. As such, delay descriptor 323 may be moved to delay queue 310-3, which encompasses delays that have between 4 and 7 ticks remaining. It should be noted that in this case, delay descriptor 323 is appended to the list after delay descriptor 318, which has a timestamp of 1054. Thus, in some cases, the delay descriptors happen to end up in the order of expiration. However, such ordering is not required, as is shown next. Delay queue 310-5 at first may have a single delay descriptor 319 in its queue. Delay descriptor 319 may have 31 ticks remaining, and is thus at the upper end of the range of delay queue 310-5. Consider that a process may request a delay of 16 ticks. As such, the timestamp for that delay would be 1066. A delay descriptor 320 may be obtained with the timestamp of 1066. Based on the ticks remaining, the delay descriptor 320 is simply appended to the end of the delay queue, without regard for any other delays that currently exist in the queue. As such, this explains how the situation arrived at with respect to delay queue 310-3 may have been achieved. Also, the situation may arise because any delay moving from one queue to another is simply appended to the end of the queue.

With a sequence of delay queues arranged as described herein, any delay which is appropriate for a given delay queue based on the ticks remaining can simply be appended to the end of that delay queue and still have the property that if the entry at the head of the delay queue is removed from the delay queue once it is no longer appropriate to be in that queue, the newly added delay will not yet have exceeded its expiration time. This property is achieved by the 2:1 ratio of ranges described above, an example of which is presented below.

For example, delay descriptor 319 has 31 ticks remaining. The worst case scenario is that delay descriptor 320, which only has 16 ticks remaining is appended to delay queue 310-4. However, the longest period of time that delay descriptor 320 may stay in delay queue 310-4 is 16 ticks. This is because once 16 ticks have passed, delay descriptor 319 would only have 15 ticks remaining and would be inappropriate for delay queue 310-5. Thus, delay descriptor 319 would be moved to delay queue 310-4. After 16 ticks have passed, delay descriptor 320 would have zero ticks remaining. Thus, the delay would be complete, without exceeding the amount of delay requested. The 2:1 range ensures that the above example holds true.

It should further be noted that a delay descriptor that is moving from one delay queue to another need not necessarily move to an immediately adjacent queue. For example, delay queue 310-6 may have two delay descriptors 321, 322 with timestamps of 1113 and 1090 respectively. Thus, the ticks remaining are 63 and 40, making delay queue 310-6 the appropriate queue. Once the counter reaches 1082, delay descriptor 321 will only have 31 ticks remaining, and will be moved to delay queue 310-5, which is immediately adjacent to delay queue 310-6. However, delay descriptor 322 would have 8 ticks remaining. Thus delay descriptor 322 would be moved to delay queue 310-4.

Figure 4:
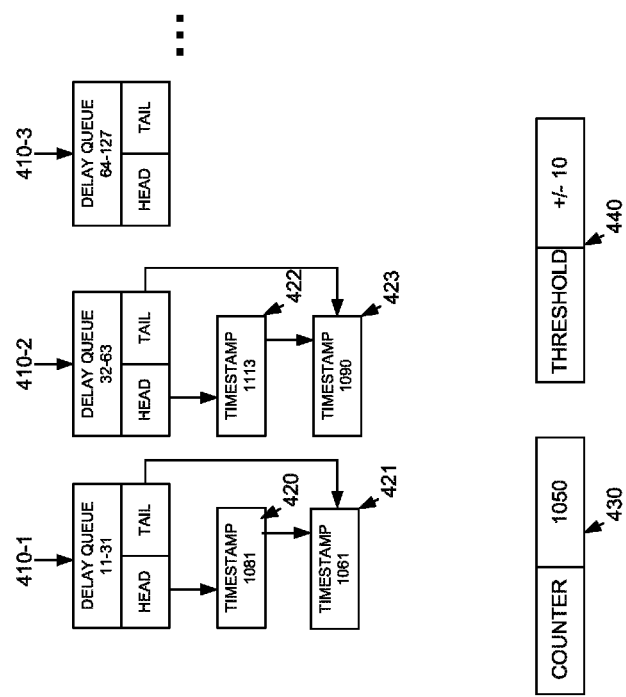
FIG. 4 depicts an example of delay queues with a reduced level of precision.

FIG. 4 depicts an example of delay queues with a reduced level of precision. In the preceding description of FIG. 3, the level of precision defined was down to an individual counter tick. However, in many applications, such a degree of precision is not required. For example, a threshold 440 may be set. Once the number of ticks remaining reaches that threshold, the delay may be considered complete.

In an example implementation that has a lower degree of precision, the ranges of the delay queues may be modified based on the desired level of precision. For example, if the desired level of precision is +/−10 ticks, the delay queues with ranges of less than or including the threshold may be eliminated. In the example, presented with respect to FIG. 3, this would mean eliminating delay queues 310-1-4. The next delay queue would then have its small end of the range reduced to the threshold value plus 1. Thus, delay queue 310-5 would now span from 11 to 31 ticks remaining. Any delay with less 10 or fewer ticks remaining may be considered complete.

FIG. 4 depicts the delay queues assuming a threshold of +/−10 ticks. As shown, delay queue 410-1 spans from 11 to 31 ticks. The remaining delay queues follow the same pattern as described above. Thus, delay queue 410-2 spans 32-63 ticks and delay queue 410-3 spans 63-127 ticks. As shown in FIG. 4, assume that delay queue 410-1 contains two delay descriptors 420, 421 with timestamps 1081 and 1061 respectively. Thus, with a counter value of 1050 there are 31 and 11 ticks remaining respectively. When the counter reaches 1071, delay descriptor 420 is within 10 ticks of being complete, and is therefore considered complete. So, the imprecision introduced is +10 ticks, which is within the desired level of precision. Delay descriptor 421 had a timestamp of 1061, which means that the delay expired 10 ticks ago. As such, the delay is considered expired 10 ticks after it should have, but within the 10 tick level of precision.

Delay descriptors 422, 423 have timestamps 1113 and 1090. This means that there are 63 and 40 ticks remaining respectively and as such, the delay descriptors belong in delay queue 420-2. Once the counter reaches 1082, delay descriptor 422 may be moved to delay queue 420-1, because there would be 31 ticks remaining. However, delay descriptor 423 would only have 8 ticks remaining. According to the threshold, this means that the delay is complete. As such, the delay descriptor is de-queued, and its associated process notified of the completion.

Figure 5:
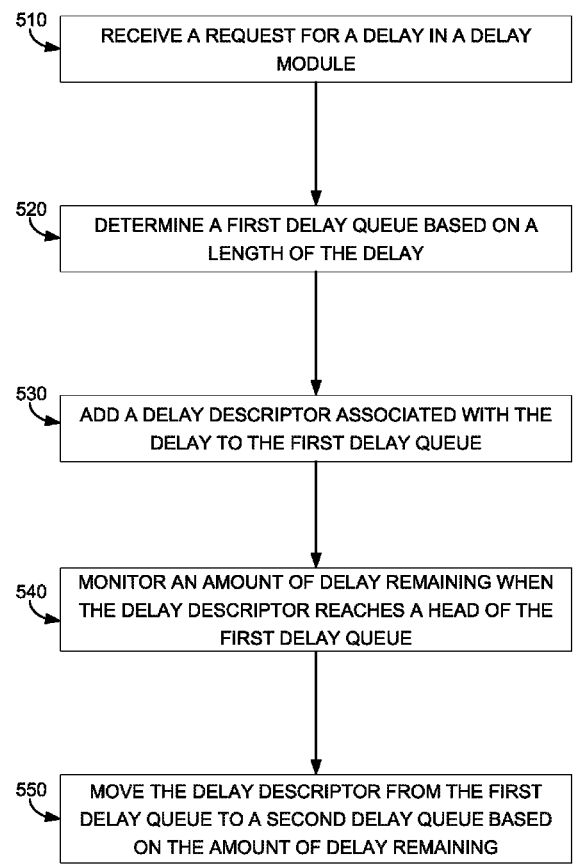
FIG. 5 depicts an example of a high level flow diagram for implementing a delay.

FIG. 5 depicts an example of a high level flow diagram for implementing a delay. In block 510 a request for a delay may be received in a delay module. The request may come from a process module. In block 520 a first delay queue may be determined based on the length of the delay. In other words, the timestamp of the delay may be determined and the delay queue may be selected based on the number of ticks remaining until the timestamp is reached. In block 530, a delay descriptor associated with the delay may be added to the first delay queue.

In block 540, the amount of delay remaining may be monitored when the delay descriptor reaches a head of the first delay queue. As explained above, once the delay descriptor reaches the head of the delay queue, the timestamp in the delay descriptor may be compared to the counter and the number of remaining ticks may be determined. In block 550, the delay descriptor maybe moved from the first delay queue to a second delay queue based on the amount of delay remaining. For example, if the number of ticks remaining is such that it is inappropriate for the delay descriptor to remain in the first queue, a second queued may be selected. As described above, the second queue need not be immediately adjacent to the first queue.

Figure 6:
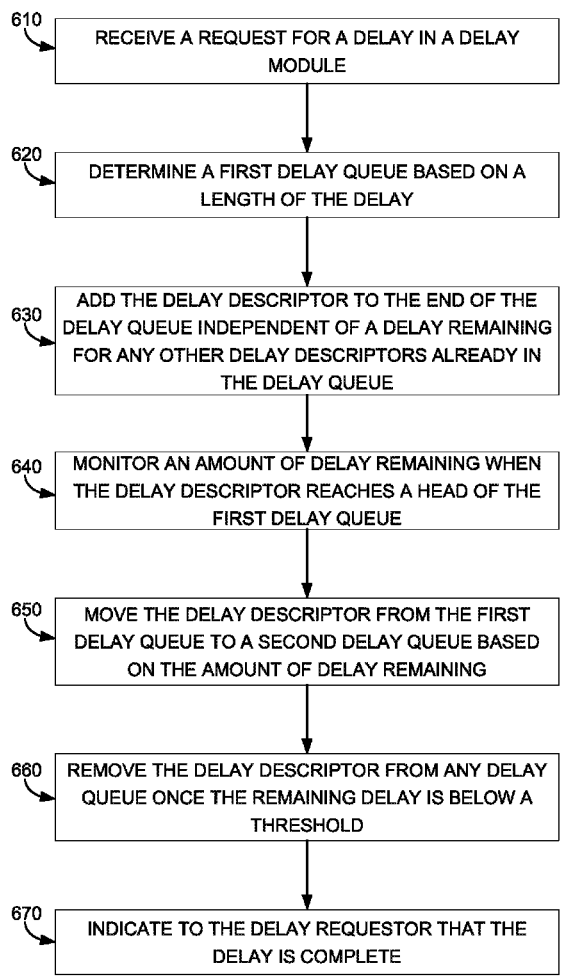
FIG. 6 depicts an example of a high level flow diagram for an implementing and expiring a delay.

FIG. 6 depicts an example of a high level flow diagram for implementing and expiring a delay. In block 610 a request for a delay may be received in a delay module. The request may come from a process module. In block 620 a first delay queue may be determined based on the length of the delay. In other words, the timestamp of the delay may be determined and the delay queue may be selected based on the number of ticks remaining until the timestamp is reached. In block 630, the delay descriptor may be added to the end of the delay queue independent of a delay remaining for any other delay descriptors already in the delay queue. As explained above, the delay queues are not order dependent. So, when a delay descriptor is added to a delay queue, it may simply be appended to the end of the queue, without regard to what is already in the queue.

In block 640, the amount of delay remaining may be monitored when the delay descriptor reaches a head of the first delay queue. In block 650, the delay descriptor may be moved from the first delay queue to a second delay queue, based on the amount of delay remaining. In block 660, the delay descriptor may be removed from any delay queue once the remaining delay is below a threshold. As described above, the threshold may be as small as a single counter tick to as large as the level of imprecision the particular implementation can tolerate. In block 670, it may be indicated to the delay requestor that the delay is complete.

Figure 7:
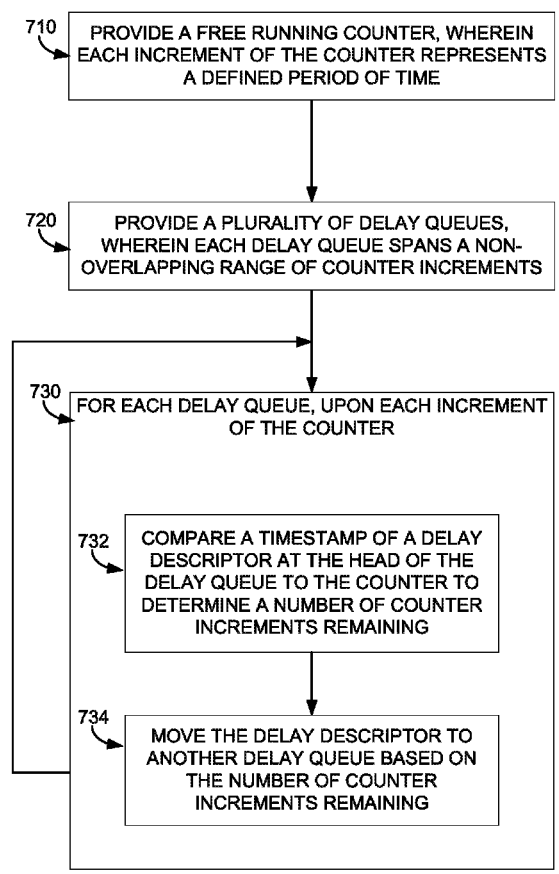
FIG. 7 depicts an example of a high level flow diagram for monitoring completion of a delay.

FIG. 7 depicts an example of a high level flow diagram for monitoring completion of a delay. In block 710 a free running counter may be provided, wherein each increment of the counter represents a defined period of time. As explained above, a process may request a delay for a period of time. This period of time may be converted into a number of ticks of the free running counter. In block 720 a plurality of delay queues may be provided, wherein each of the delay queues spans a non-overlapping range of counter increments. In other words, each delay queue may hold delay descriptors whose ticks remaining is appropriate for that particular queue.

In block 730, for each delay queue, upon each increment of the counter, the following steps may be executed. In block 732, a timestamp of a delay descriptor at the head of the delay queue may be compared to the counter to determine a number of counter increments remaining. In block 734, the delay descriptor may be moved to another delay queue based on the number of counter increments remaining. As explained above, if a delay descriptor is moved or is considered expired, the next delay descriptor in the delay queue may be examined, and the process repeated.

Figure 8:
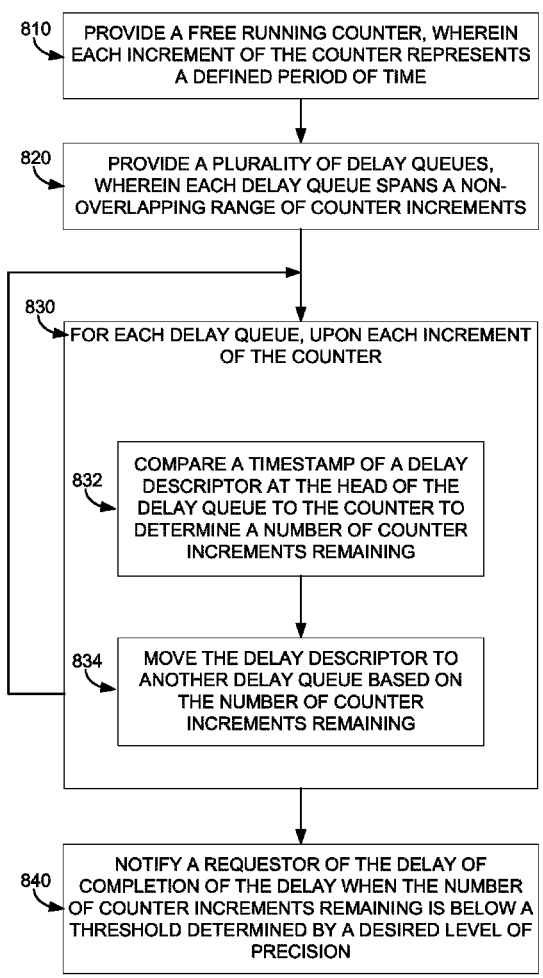
FIG. 8 depicts another example of a high level flow diagram for monitoring completion of a delay and a delay completing.

FIG. 8 depicts another example of a high level flow diagram for monitoring completion of a delay and a delay completing. In block 810 a free running counter may be provided, wherein each increment of the counter represents a defined period of time. In block 820 a plurality of delay queues may be provided, wherein each of the delay queues spans a non-overlapping range of counter increments.

In block 830, for each delay queue, upon each increment of the counter, the following steps may be executed. In block 832, a timestamp of a delay descriptor at the head of the delay queue may be compared to the counter to determine a number of counter increments remaining. In block 834, the delay descriptor may be moved to another delay queue based on the number of counter increments remaining. If additional delay descriptors remain in the delay queue, the process is repeated, as described above.

In block 840, a requestor of the delay may be notified of completion of the delay when the number of counter increments remaining is below a threshold determined by a desired level of precision. As explained above, the desired level of precision may be as small as an individual counter increment. The desired level of precision may also be as large as the application using the delays can tolerate.

I claim:

1. A method comprising:
receiving a request for a delay in a delay module;
determining a first delay queue based on a length of the delay;
adding a delay descriptor associated with the delay to the first delay queue, wherein adding the delay descriptor to any delay queue further comprises:
adding the delay descriptor to the end of the delay queue independent of a delay remaining for any other delay descriptors already in the delay queue;
monitoring an amount of delay remaining when the delay descriptor reaches a head of the first delay queue; and
moving the delay descriptor from the first delay queue to a second delay queue based on the amount of delay remaining.

2. The method of claim 1 further comprising:
removing the delay descriptor from any delay queue once the remaining delay is below a threshold; and
indicating to the delay requestor that the delay is complete.

3. The method of claim 2 wherein the threshold is one third of a delay range of a minimum delay queue.

4. The method of claim 2 wherein the threshold is the minimum delay that may be requested.

5. The method of claim 1 wherein each delay queue is a first in first out linked list and adding the delay descriptor to the delay queue further comprises:
appending the delay descriptor to a tail of the linked list.

6. The method of claim 1 wherein the delay descriptor includes an identification of the delay requestor.

7. The method of claim 1 wherein every delay requestor is associated with an individual delay descriptor.

8. A method comprising:
providing a free running counter, wherein each increment of the counter represents a defined period of time;
providing a plurality of delay queues, wherein each delay queue spans a non-overlapping range of counter increments, wherein the delay queues are ordered by the range of counter increments and the range of counter increments for each delay queue is twice the range of the immediately preceding delay queue for all delay queues except for the delay queue with the smallest range, wherein the range of the delay queue with the smallest range is determined by a desired level of precision; and for each delay queue, upon each increment of the counter:
comparing a timestamp of a delay descriptor at the head of the delay queue to the counter to determine a number of counter increments remaining; and
moving the delay descriptor to another delay queue based on the number of counter increments remaining.

9. The method of claim 8 further comprising:
notifying a requestor of the delay of completion of the delay when the number of counter increments remaining is below a threshold determined by a desired level of precision.

10. A device comprising:
a counter, the counter being incremented upon passage of a defined period of time;
a plurality of process modules to request delays; and
a delay module including a plurality of delay queues, each queue spanning a non-overlapping range of counter increments, to receive a request for a delay from a process module, compute a timestamp for the expiration of the delay based on the counter, include the timestamp in a delay descriptor, and add the delay descriptor to one of the plurality of delay queues based on a number of counter increments until the delay is complete, the delay module to further move the delay descriptor to the delay queue whose range includes the number of counter increments remaining; and
a comparator module to compare the timestamp of the delay descriptor to the counter and to determine the number of counter increments remaining until the delay is complete, wherein the delay module further notifies the process module that requested the delay of completion of the delay once the number of counter increments remaining falls below a threshold value.

\* \* \* \* \*